US012263835B2

(12) United States Patent
Ucar et al.

(10) Patent No.: US 12,263,835 B2
(45) Date of Patent: Apr. 1, 2025

(54) SYSTEMS AND METHODS FOR DETECTING AN OBJECT IN AN ENVIRONMENT OF A VEHICLE (71) Applicant: Toyota Motor Engineering & Manufacturing North America, Inc., Plano, TX (US)

(72) Inventors: Seyhan Ucar, Mountain View, CA (US); Emrah Akin Sisbot, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 211 days.

(21) Appl. No.: 17/890,596

(22) Filed: Aug. 18, 2022

(65) Prior Publication Data
US 2024/0059279 A1 Feb. 22, 2024

(51) Int. Cl.
*B60W 30/09* (2012.01)
*G08G 1/0967* (2006.01)
*G08G 1/16* (2006.01)

(52) U.S. Cl.
CPC ....... *B60W 30/09* (2013.01); *G08G 1/096708* (2013.01); *G08G 1/166* (2013.01)

(58) Field of Classification Search
CPC ............ B60W 30/09; B60W 2050/143; G08G 1/096708; G08G 1/166
See application file for complete search history.

(56) References Cited

U.S. PATENT DOCUMENTS

| 7,493,202 | B2 | 2/2009 | Demro et al. |
| 9,135,822 | B2 | 9/2015 | Lucking et al. |
| 10,539,963 | B2 | 1/2020 | Adomat et al. |
| 10,741,081 | B2 * | 8/2020 | Grimm ................... B60L 58/12 |
| 11,062,157 | B2 | 7/2021 | Lee et al. |
| 11,256,932 | B2 * | 2/2022 | Hasegawa ............. B60W 30/09 |

FOREIGN PATENT DOCUMENTS

| CN | 111497773 | A | | 8/2020 |
| CN | 114387819 | A | * | 4/2022 |
| DE | 102014210259 | A1 | | 12/2015 |
| DE | 102014225881 | A1 | * | 6/2016 |
| DE | 102016218080 | B3 | * | 8/2017 |
| EP | 1594727 | A1 | | 11/2005 |
| JP | 2004185108 | A | | 7/2004 |
| JP | 2008254487 | A | | 10/2008 |
| JP | 5982072 | B2 | | 8/2016 |

OTHER PUBLICATIONS

English translation of CN-114387819-A (Year: 2022).*
English translation of DE-102014225881-A1 (Year: 2016).*
English translation of DE-102016218080-B3 (Year: 2017).*

* cited by examiner

*Primary Examiner* — Shon G Foley
(74) *Attorney, Agent, or Firm* — Dinsmore & Shohl LLP (57) ABSTRACT

Systems include a controller programmed to instruct a sensor to detect an object in an environment of a vehicle in response to an activation of a fall-on-car prevention function, determine a first value of a parameter pertaining to the object at a first time with the sensor, determine a second value of the parameter pertaining to the object at a second time with the sensor, and automatically cause an action to occur based on a comparison of the first value of the parameter and the second value of the parameter.

19 Claims, 5 Drawing Sheets

SYSTEMS AND METHODS FOR DETECTING AN OBJECT IN AN ENVIRONMENT OF A VEHICLE

TECHNICAL FIELD

The present disclosure relates to systems and methods for detecting an object in an environment of a vehicle.

BACKGROUND

It may be desirable for a number of reasons to detect fall-on-car accidents while parking (i.e., falling basketball hoop due to strong wind in the driveway), and inform nearby drivers. Such types of fall-on-car accidents are preventable through the early detection of objects that may fall on vehicles.

In general, conventional systems and methods detect other nearby objects and assess the situation to determine the risk of collision. However, these systems and methods may assume that vehicles are in running mode while measuring or observing potential conflicts in a proximate environment. However, most of the fall-on-car accidents happen when vehicles are stationary (e.g., parked). Conventional systems and methods do not predict fall-on-car accidents when vehicles are stationary.

Accordingly, a need exists for systems and methods that detect fall-on-car accidents while the vehicles are stationary with improved accuracy, and output an alert about potential fall-on-car accidents to mitigate situations caused by these fall-on-car accidents.

SUMMARY

The present disclosure provides systems and methods for detecting an object in an environment of a vehicle, which detect fall-on-car accidents with improved accuracy and output an alert about potential fall-on-car accidents to mitigate situations caused by these fall-on-car accidents. The systems and methods activate a fall-on-car prevention function, and detect any changes compared to a first value of a parameter. When the systems and methods detect any changes, the driver of the vehicle is notified before any abnormal events, such as fall-on-car accidents, happen, thereby avoiding an undesirable situation, such as fall-on-car accidents.

In one or more embodiments, a system for detecting an object in an environment of a vehicle is provided. The system includes a controller programmed to instruct a sensor to detect an object in an environment of a vehicle in response to an activation of a fall-on-car prevention function, determine a first value of a parameter pertaining to the object at a first time with the sensor, determine a second value of the parameter pertaining to the object at a second time with the sensor, and automatically cause an action to occur based on a comparison of the first value of the parameter at the first time and the second value of the parameter at the second time.

In another embodiment, a method for detecting an object in an environment of a vehicle is provided. The method includes detecting an object in an environment of a vehicle in response to an activation of a fall-on-car prevention function, determining a first value of a parameter pertaining to the object at a first time with a sensor, determining a second value of the parameter pertaining to the object at a second time with the sensor, and automatically causing an action to occur based on a comparison of the first value of the parameter at the first time and the second value of the parameter at the second time.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The embodiments disclosed herein include methods, systems, and vehicles for detecting an object in an environment of a vehicle, which detect fall-on-car accidents with improved accuracy and output an alert about potential fall-on-car accidents to mitigate situations caused by these fall-on-car accidents. The systems and methods activate a fall-on-car prevention function, and detect any changes compared to a first value of a parameter. When the systems and methods detect any changes, the driver of the vehicle is notified before any abnormal events, such as fall-on-car accidents, happen, thereby avoiding an undesirable situation, such as fall-on-car accidents.

Figure 1:
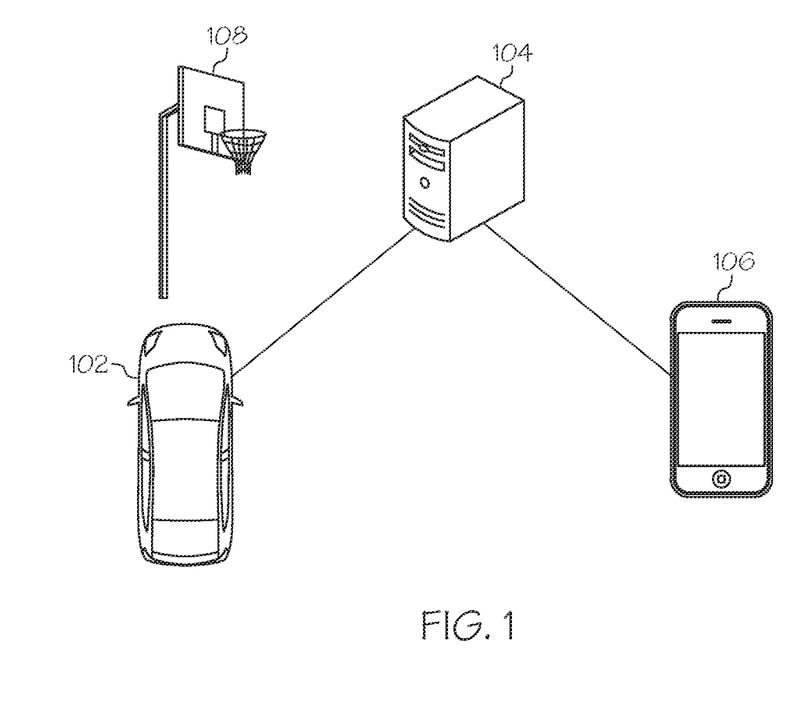
FIG. 1 depicts a schematic diagram of a system for detecting an object in an environment of a vehicle where the object is around the vehicle, according to one or more embodiments shown and described herein.
Figure 2:
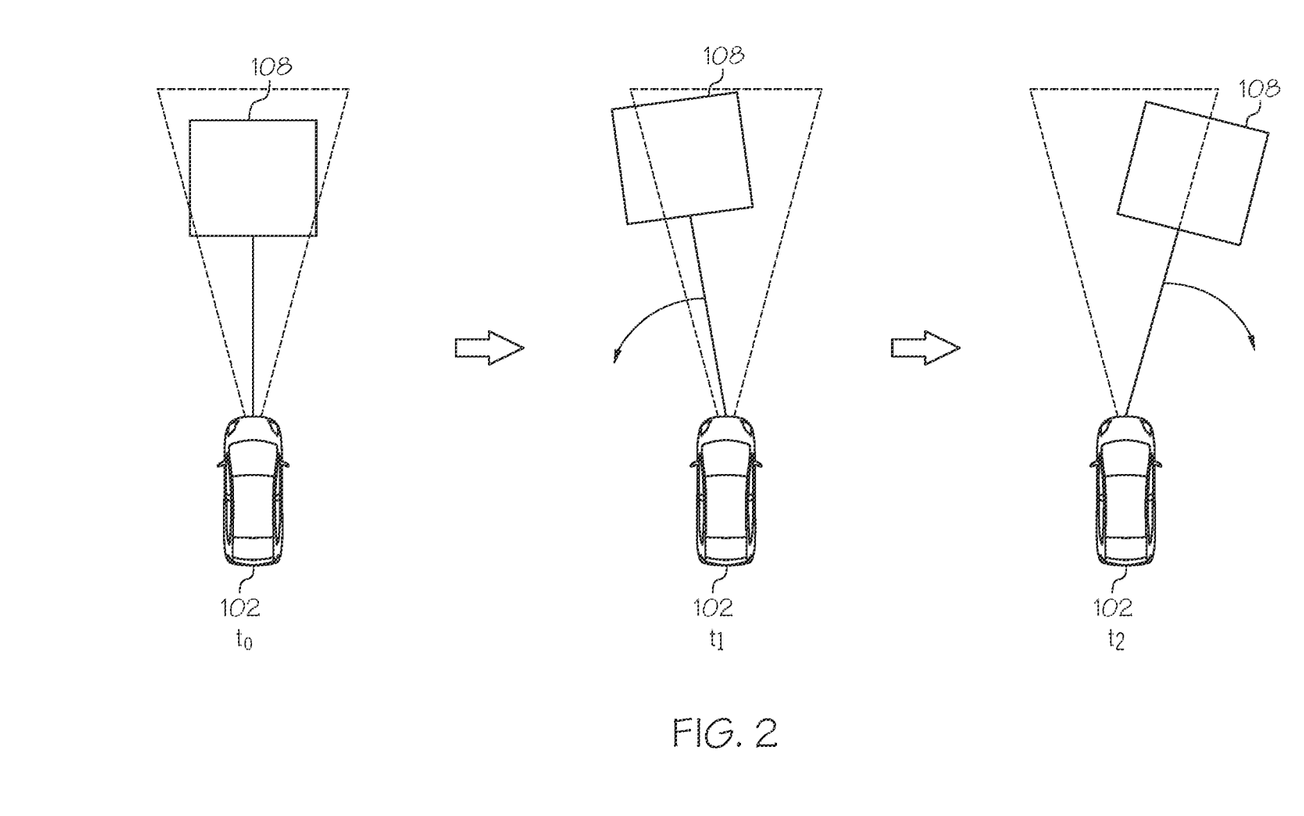
FIG. 2 schematically depicts an exemplary embodiment of detecting an object in an environment of a vehicle where the object moved from center to left and then to right, according to one or more embodiments shown and described herein.

FIG. 1 depicts a schematic diagram of a system for detecting an object in an environment of a vehicle where the object is around the vehicle. FIG. 2 schematically depicts an exemplary embodiment of detecting an object in an environment of a vehicle where the object moved from the center to the left of the vehicle and then to the right of the vehicle, according to one or more embodiments shown and described herein.

Referring to FIGS. 1 and 2, a vehicle 102 may be stationary near an object 108. For example, the vehicle 102 may be parked near the object 108. The vehicle 102 may be a vehicle including an automobile or any other passenger or non-passenger vehicle such as, for example, a terrestrial, aquatic, and/or airborne vehicle. In some embodiments, the vehicle 102 may be an autonomous driving vehicle. The vehicle 102 may be an autonomous vehicle that navigates its environment with limited human input or without human input. The vehicle 102 may be equipped with internet access and share data with other devices both inside and outside the vehicle 102. The vehicle 102 may communicate with the server 104 and transmit its data to the server 104. For example, the vehicle 102 transmits information about its current location and destination, its environment, information about a current driver, information about a task that it is currently implementing, and the like. The vehicle 102 may include an actuator configured to move the vehicle 102.

The vehicle 102 may detect the object 108 in an environment of the vehicle 102 using one or more sensors. The vehicle 102 may instruct the one or more sensors to detect the object 108 in an environment of the vehicle 102. In some embodiments, the one or more sensors may be included in the vehicle 102. The one or more sensors may be any device having an array of sensing devices capable of detecting radiation in an ultraviolet wavelength band, a visible light wavelength band, or an infrared wavelength band. The one or more sensors may include one or more LIDAR sensors, radar sensors, sonar sensors, cameras, or other types of sensors for gathering data that could be integrated into or supplement the data collection. In some embodiments, one or more optical components, such as a mirror, fish-eye lens, or any other type of lens may be optically coupled to the one or more sensors. In some embodiments, additional sensors external to the vehicle 102 may detect the object 108. For example, a security camera or a camera of a mobile device external to the vehicle 102 may detect the object 108.

The vehicle 102 may instruct the sensor to detect the object 108 in an environment of the vehicle 102 in response to an activation of a fall-on-car prevention function. In some embodiments, the fall-on-car prevention function may be automatically activated prior to the vehicle 102 become stationary. For example, referring to FIG. 2, before the vehicle 102 is parked, the vehicle 102 may observe the surrounding of the vehicle 102, detect nearby object 108 of interest, e.g., a basketball hoop, and activate the fall-on-car prevention function. In some embodiments, the fall-on-car prevention function may be automatically activated after the vehicle 102 becomes stationary. By referring to FIG. 2, after the vehicle 102 is parked, the vehicle 102 may observe the surrounding of the vehicle 102, detect nearby object 108 of interest, e.g., a basketball hoop, and activate the fall-on-car prevention function. In some embodiments, the fall-on-car prevention function may be periodically activated while the vehicle 102 is stationary.

In some embodiments, the fall-on-car prevention function is activated based on a weather status of the environment of the vehicle 102. For example, the vehicle 102 may receive information of a weather status around the location of the vehicle 102. When the vehicle 102 receive a bad weather forecast, e.g., windy, snowy, stormy, or etc., the vehicle 102 may activate the fall-on-car prevention function.

In some embodiments, the fall-on-car prevention function may be activated based on an activation of a button of the vehicle 102. For example, the driver of the vehicle 102 may activate the button of the vehicle 102, and then the fall-on-car prevention function may be activated.

In some embodiments, once the fall-on-car prevention function is activated, the vehicle 102 may scan the environment of the vehicle 102 and detect an object 108 around the vehicle 102. The controller may process an image of the object 108 and identify the object 108. For example, the controller may determine metadata for the object 108 based on the identification of the object, e.g., metadata for a basketball hoop. The metadata may include, but not limited to, metadata for a tree, a pedestrian, a vehicle 102, bicycle, a drone, an animal, and the like. Once the metadata corresponds to predetermined metadata (e.g., metadata for a tree or a basketball hoop), the vehicle 102 may continuously monitor corresponding object 108.

Still referring to FIGS. 1 and 2, when the fall-on-car prevention function is activated, the vehicle 102 may determine a first value of a parameter pertaining to the object 108 at a first time with the sensor. The parameter may include at least one of the location of the object 108, an image of the object 108, a pose of the object 108, one or more key points on the object 108, and a distance between a key point of the object 108 and a key point of other object. The vehicle 102 may further observe the surrounding of the object 108.

Referring to FIG. 2, when the location of the top portion, or key point of the object 108, e.g. the basketball hook up, is about to move from the center to left relative to the location where the vehicle 102 is parked, the vehicle 102 may determine a location of the top portion, or key point of the basketball hoop at time $t_0$ as the first value pertaining to the basketball hoop. In some embodiments, the vehicle 102 may determine the default posture of the basketball hoop at time $t_0$ in FIG. 2, i.e., the one that is not swinging, as the first value pertaining to the basketball hoop. In some embodiments, the vehicle 102 may determine the angle between a vertical line and the center axis of the basketball hoop at time $t_0$ in FIG. 2, as the first value pertaining to the basketball hoop. In this case, the angle between the vertical line and the center axis of the basketball hoop is about 0 degree because the basketball hoop is not swinging.

The vehicle 102 may determine a second value of the parameter pertaining to the object at a second time with the sensor. By referring to FIG. 2, the vehicle 102 may determine a location of the top portion, or key point of the basketball hoop at time $t_1$ or $t_2$, as the second value pertaining to the basketball hoop. In some embodiments, the vehicle 102 may determine the posture of the basketball hoop at time $t_1$ or $t_2$ in FIG. 2, as the second value pertaining to the basketball hoop. In some embodiments, the vehicle 102 may determine the angle between a vertical line and the center axis of the basketball hoop at time $t_1$ or $t_2$ in FIG. 2, as the second value pertaining to the basketball hoop.

The vehicle 102 may automatically cause an action to occur based on a comparison of the first value of the parameter at the first time and the second value of the parameter at the second time. Referring to FIG. 2, the vehicle 102 may compare the first value of the parameter and the second value of the parameter. For example, the vehicle 102 may compare a location of the top portion, or key point of the basketball hoop at time $t_0$ and a location of the top portion, or key point of the basketball hoop at time $t_1$ or $t_2$. The vehicle 102 may compare the default posture of the basketball hoop in FIG. 2, i.e., the one that is not swinging, at time $t_0$ and the posture of the basketball hoop at time $t_1$ or $t_2$. The vehicle 102 may compare the angle between a vertical line and the center axis of the basketball hoop in FIG. 2 at time $t_0$, about 0 degree, and the angle between a vertical line and the center axis of the basketball hoop at time $t_1$ or $t_2$.

Based on the comparison, the vehicle 102 may determine whether the object 108 is moving enough such that the object 108 may fall. When the vehicle 102 determines that the object 108 is moving enough such that the object 108 may fall, the vehicle 102 may determine whether the vehicle 102 is within an object falling range. The object falling range may be determined based on a distance between the object 108 and the vehicle 102, the size of the object 108, the dimension of the object 108, such as the height of the object 108, the size of the vehicle 102, the dimension of the vehicle 102, or combinations thereof. For example, when the relative distance between a location of the top portion, or key point of the basketball hoop at time $t_0$ and a location of the top portion, or key point of the basketball hoop at time $t_1$ or $t_2$ is greater than a threshold distance, the vehicle 102 may determine that the object 108 is within the object falling range and falls. In some embodiments, when relative angles between a vertical line and the center axis of the basketball hoop at time $t_0$, about 0 degree, and a vertical line and the center axis of the basketball hoop at time $t_1$ or $t_2$ is greater than a threshold angle, the vehicle 102 may determine that the object 108 is within the object falling range and falls.

In some embodiments, when the vehicle 102 is within the object falling range, the vehicle 102 may provide the notification to the server 104 communicatively coupled to the vehicle 102. The notification may be the indicative of the comparison of the first value of the parameter at the first time and the second value of the parameter at the second time.

In some embodiments, when the vehicle 102 is within the object falling range, the server 104 may remotely operate the vehicle 102 to move outside of the object falling range. Alternatively, the vehicle 102 may autonomously move outside of the object falling range.

In some embodiments, the vehicle 102, the server 104, or both may provide a notification to the device 106 of the driver indicative of the object falling based on the comparison of the first value of the parameter at the first time and the second value of the parameter at the second time. The device 106 of the driver of the vehicle 102 may include a smartphone, a smartwatch, a laptop, a tablet computer, a personal computer, and a wearable device, or combinations thereof. In some embodiments, when the vehicle 102 determines that the vehicle 102 is within the object falling range, the vehicle 102 may transmit the notification to the device 106 of the driver of the vehicle 102. The driver may drive the vehicle to move outside of the object falling range. Alternatively, the vehicle may autonomously move outside of the object falling range.

In some embodiments, the driver of the vehicle 102 may instruct the sensor to silence future notifications based on the location of the vehicle 102. The vehicle 102 may receive the signal from the device 106 of the driver instructing the sensor to silence future notifications. For example, the driver of the vehicle 102 may instruct the sensor to silence future notifications when there is no object 108 around the vehicle 102 or the object 108 is outside of the object falling range.

In some embodiments, the driver of the vehicle 102 may instruct the sensor to silence future notifications based on an object classification associated with the object 108 in the environment of the vehicle 102. The vehicle 102 may receive a signal from the device 106 of the driver instructing the sensor to silence future notifications. For example, the driver of the vehicle 102 may instruct the sensor to silence future notifications when the object 108 is small or firmly locked. As another example, the driver of the vehicle 102 may instruct the sensor to silence future notifications when the detected object is not a threat to the vehicle 102, e.g., a pedestrian, an animal, and the like.

Figure 3:
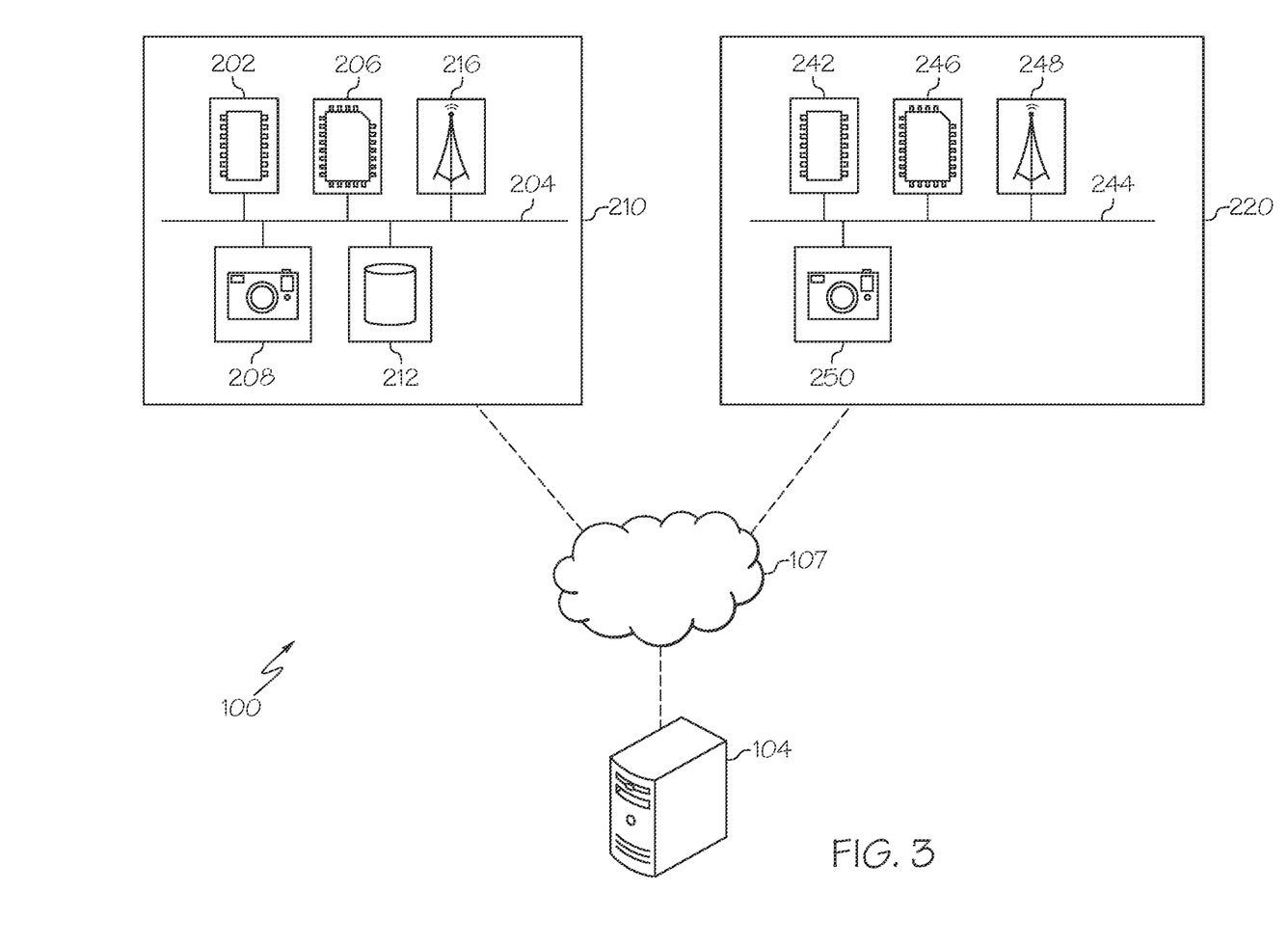
FIG. 3 depicts a schematic diagram of a system for detecting an object in an environment of a vehicle, according to one or more embodiments shown and described herein.

FIG. 3 depicts a schematic diagram of a system for detecting an object in an environment of a vehicle, according to one or more embodiments shown and described herein. The system 100 may include the vehicle system 210, the server 104, and the device system 220.

It is noted that, while FIG. 3 depicts that the vehicle system 210 communicates with one device system 220, the vehicle system 210 may communicate with more than one device system 220. In embodiments, each of the vehicle system 210 and the device system 220 may be included within a vehicle that may be an automobile or any other passenger or non-passenger vehicle such as, a terrestrial, aquatic, and/or airborne vehicle. In some embodiments, the vehicle may be an autonomous vehicle that navigates its environment with limited human input or without human input.

The vehicle system 210 includes one or more processors 202. Each of the one or more processors 202 may be any device capable of executing machine-readable and executable instructions. Each of the one or more processors 202 may be a controller, an integrated circuit, a microchip, a computer, or any other computing device. The one or more processors 202 are coupled to a communication path 204 that provides signal interconnectivity between various modules of the system. The communication path 204 may communicatively couple any number of processors 202 with one another, and allow the modules coupled to the communication path 204 to operate in a distributed computing environment. Each of the modules may operate as a node that may send and/or receive data. As used herein, the term "communicatively coupled" means that coupled components are capable of exchanging data signals with one another such as, electrical signals via a conductive medium, electromagnetic signals via air, and optical signals via optical waveguides, and the like.

The communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. The communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. The communication path 204 may comprise a vehicle bus, such as a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 210 includes one or more memory modules 206 coupled to the communication path 204. The one or more memory modules 206 may comprise RAM, ROM, flash memories, hard drives, or any device capable of storing machine-readable and executable instructions such that the machine-readable and executable instructions can be accessed by the one or more processors 202. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory modules 206. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 202 along with the one or more memory modules 206 may operate as a controller for the vehicle system 210.

Still referring to FIG. 3, the vehicle system 210 includes one or more sensors 208. The one or more sensors 208 may be any device having an array of sensing devices capable of detecting radiation in an ultraviolet wavelength band, a visible light wavelength band, or an infrared wavelength band. The one or more sensors 208 may detect an object, such as the object 108 in an environment of the vehicle 102 in FIG. 1, the first value of the parameter, the second value of the parameter, or combinations thereof. The one or more sensors 208 may have any resolution. In some embodiments, one or more optical components, such as a mirror, fish-eye lens, or any other type of lens may be optically coupled to the one or more sensors 208. In embodiments, the one or more sensors 208 may provide image data to the one or more processors 202 or another component communicatively coupled to the communication path 204. In some embodiments, the one or more sensors 208 may provide navigation support. Data captured by the one or more sensors 208 may be used to autonomously or semi-autonomously navigate the vehicle 102 in FIG. 1.

In some embodiments, the one or more sensors 208 include one or more imaging sensors configured to operate in the visual and/or infrared spectrum to sense visual and/or infrared light. In some embodiments, the one or more sensors 208 include one or more LIDAR sensors, radar sensors, sonar sensors, or other types of sensors for gathering data that could be integrated into or supplement the data collection described herein. Ranging sensors like radar sensors may be used to obtain rough depth and speed information for the view of the vehicle system 210.

The vehicle system 210 includes one or more vehicle sensors 212. Each of the one or more vehicle sensors 212 are coupled to the communication path 204 and communicatively coupled to the one or more processors 202. The one or more vehicle sensors 212 may include one or more motion sensors for detecting and measuring motion and changes in the motion of the vehicle or the object. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle or the object.

Still referring to FIG. 3, the vehicle system 210 includes network interface hardware 216 for communicatively coupling the vehicle system 210 to the device system 220. The network interface hardware 216 may be communicatively coupled to the communication path 204 and can be any device capable of transmitting and/or receiving data via a network. The network interface hardware 216 can include a communication transceiver for sending and/or receiving any wired or wireless communication. In embodiments, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the vehicle system 210 may transmit its data to the device system 220. In embodiments, the network interface hardware 216 of the vehicle system 210 may transmit vehicle data, location data, maneuver data and the like to other target vehicles, a cloud server, edge servers, and the like.

The vehicle system 210 may connect with one or more external vehicle systems (e.g., the device system 220) and/or external processing devices (e.g., a cloud server, or an edge server) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The vehicle system 210 may communicate with external communicate vehicle systems using wireless messages such as basic safety messages (BSMs), maneuver messages (MMs), and the like. BSM is a wireless message transmitted between vehicles where the transmitter sends its position, speed, and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

In embodiments, the vehicle system 210 may function as infrastructure nodes to form a mesh network and connect dynamically on an ad-hoc basis. The vehicle system 210 may enter and/or leave the network at will, such that the mesh network may self-organize and self-modify over time. In embodiments, the vehicle system 210 may form peer-to-peer networks with other vehicles or utilize centralized networks that rely upon certain vehicle systems and/or infrastructure elements. Still, other examples include networks using centralized servers and other central computing devices to store and/or relay information between vehicle systems.

Still referring to FIG. 3, the vehicle system 210 may be communicatively coupled to the device system 220 or the server 104 by the network 107. In one embodiment, the network 107 may include one or more computer networks (e.g., a personal area network, a local area network, or a wide area network), cellular networks, satellite networks, and/or a global positioning system and combinations thereof. The vehicle system 210 may be communicatively coupled to the network 107 via a wide area network, via a local area network, via a personal area network, via a cellular network, via a satellite network, etc. In embodiments, local area networks may include wired Ethernet and/or wireless technologies such as, for example, Wi-Fi. In embodiments, personal area networks may include wireless technologies such as, for example, IrDA, Bluetooth®, Wireless USB, Z-Wave, ZigBee, and/or other near field communication protocols. In embodiments, cellular networks include, but are not limited to, technologies such as LTE, WiMAX, UMTS, CDMA, and GSM.

Still referring to FIG. 3, the device system 220 includes one or more processors 242, one or more memory modules 246, one or more sensors 250, a network interface hardware 248, and a communication path 244 communicatively connected to the other components of the device system 220. The components of the device system 220 may be structurally similar to and have similar functions as the corresponding components of the vehicle system 210 (e.g., the one or more processors 242 corresponds to the one or more processors 202, the one or more memory modules 246 corresponds to the one or more memory modules 206, the one or more sensors 250 corresponds to the one or more sensors 208, the communication path 244 corresponds to the communication path 204, and the network interface hardware 248 corresponds to the network interface hardware 216).

Still referring to FIG. 3, the server 104 includes one or more processors, one or more memory modules, a network interface hardware, one or more vehicle sensors, and a communication path communicatively connected to the other components of the vehicle system 210 and/or the other components of the device system 220. The components of the server 104 may be structurally similar to and have similar functions as the corresponding components of the device system 220. In embodiments, the server 104 may collect data of an object, such as the object 108 in an environment of the vehicle 102 in FIG. 1, the first value of the parameter, the second value of the parameter, or combinations thereof.

It should be understood that the components illustrated in FIG. 3 are merely illustrative and are not intended to limit the scope of this disclosure. More specifically, while the components in FIG. 3 are illustrated as residing within the vehicle system 210, the device system 220, or both, this is a non-limiting example. In some embodiments, one or more of the components may reside external to the vehicle system 210, the device system 220, or both, such as with the server 104.

Figure 4:
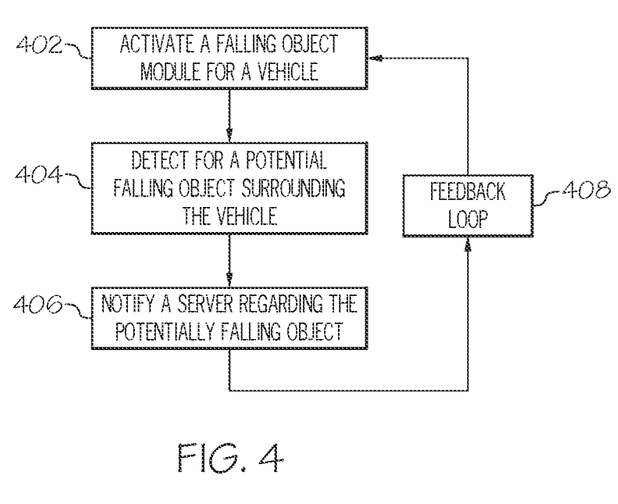
FIG. 4 depicts a flowchart for a method of detecting an object in an environment of a vehicle, according to one or more embodiments shown and described herein.

Referring now to FIG. 4, a flowchart of a method that may be performed by the vehicle, the server, the device, or combinations thereof of FIG. 1 is depicted.

Referring to FIG. 4, in step 402, the controller may activate a fall-on-car prevention function. The controller may be included in the vehicle, the server, other vehicle, road side unit, camera, or combinations thereof. In some embodiments, the fall-on-car prevention function may be automatically activated prior to the vehicle become stationary. For example, referring to FIG. 2, before the vehicle 102 is parked, the controller may observe the surrounding and detect nearby object 108 of interest, e.g., a basketball hoop, and activate the fall-on-car prevention function. In some embodiments, the fall-on-car prevention function may be automatically activated after the vehicle becomes stationary. By referring to FIG. 2, after the vehicle 102 is parked, the controller may observe the surrounding and detect nearby object 108 of interest, e.g., a basketball hoop, and activate the fall-on-car prevention function. In some embodiments, the fall-on-car prevention function is periodically activated the fall-on-car prevention function while the vehicle is stationary.

In some embodiments, the fall-on-car prevention function may be activated based on a weather status of the environment of the vehicle. For example, the controller may receive information of a weather status around a location of the vehicle. When the controller receives a bad weather forecast, e.g., windy, snowy, stormy, or etc., the controller may activate the fall-on-car prevention function.

In some embodiments, the fall-on-car prevention function is activated based on an activation of a button of the vehicle. For example, the driver of the vehicle may activate the button of the vehicle, and then the controller may activate the fall-on-car prevention function.

Referring back to FIG. 4, in step 404, the controller may detect a potential falling object surrounding the vehicle. When the fall-on-car prevention function is activated, the controller may detect a potential falling object, and then determine a first value of a parameter pertaining to the object at a first time with a sensor. Referring to FIG. 2, when the location of the top portion, or key point of the object 108, e.g. the basketball hook up, is about to move from the center to left relative to the location where the vehicle 102 is parked, the controller may determine a location of the top portion, or key point of the basketball hoop at time $t_0$ as the first value pertaining to the basketball hoop. In some embodiments, the controller may determine the default posture of the basketball hoop at time $t_0$ in FIG. 2, i.e., the one that is not swinging, as the first value pertaining to the basketball hoop. In some embodiments, the controller may determine the angle between a vertical line and the center axis of the basketball hoop at time $t_0$ in FIG. 2, as the first value pertaining to the basketball hoop. In this case, the angle between the vertical line and the center axis of the basketball hoop is about 0 degree because the basketball hoop is not swinging.

Referring back to FIG. 4, in step 404, the controller may continuously monitor the object and a second value of the parameter pertaining to the object at a second time with the sensor. By referring to FIG. 2, the controller may determine a location of the top portion, or key point of the basketball hoop at time $t_1$ or $t_2$, as the second value pertaining to the basketball hoop. In some embodiments, the controller may determine the posture of the basketball hoop at time $t_1$ or $t_2$ in FIG. 2, as the second value pertaining to the basketball hoop. In some embodiments, the controller may determine the angle between a vertical line and the center axis of the basketball hoop at time $t_1$ or $t_2$ in FIG. 2, as the second value pertaining to the basketball hoop.

Referring back to FIG. 4, in step 406, the controller may notify the server regarding the potentially falling object. The controller may compare the first value of the parameter at the first time and the second value of the parameter at the second time. By referring to FIG. 2, the controller may compare the first value of the parameter and the second value of the parameter. For example, the controller may compare a location of the top portion, or key point of the basketball hoop at time $t_0$ and a location of the top portion, or key point of the basketball hoop at time $t_1$ or $t_2$. In some embodiments, the controller may compare the default posture of the basketball hoop in FIG. 2, i.e., the one that is not swinging, at time $t_0$ and the posture of the basketball hoop at time $t_1$ or $t_2$. In some embodiments, the controller may compare the angle between a vertical line and the center axis of the basketball hoop in FIG. 2 at time $t_0$, about 0 degree, and the angle between a vertical line and the center axis of the basketball hoop at time $t_1$ or $t_2$.

Based on the comparison, the controller may determine whether the object 108 is moving enough such that the object 108 may fall. When the controller determines that the object 108 is moving enough such that the object 108 may fall, the controller may determine whether the vehicle 102 is within the object falling range. The object falling range may be determined based on the distance between the object 108 and the vehicle 102, the size of the object 108, the dimension of the object 108, such as the height of the object 108, the size of the vehicle 102, a dimension of the vehicle 102, or combinations thereof. For example, by referring to FIG. 2, when the relative distance between a location of the top portion, or key point of the basketball hoop at time $t_0$ and a location of the top portion, or key point of the basketball hoop at time $t_1$ or $t_2$ is greater than a threshold distance, the controller may determine that the object 108 is within the object falling range and falls. In some embodiments, when relative angles between a vertical line and the center axis of the basketball hoop at time $t_0$, about 0 degree, and a vertical line and the center axis of the basketball hoop at time $t_1$ or $t_2$ is greater than a threshold angle, the controller may determine that the object 108 is within the object falling range and falls.

In some embodiments, when the vehicle 102 is within the object falling range, the controller may notify the server 104 regarding potentially falling object. In some embodiments, when the vehicle 102 is within the object falling range, the server 104 may remotely operate the vehicle 102 to move outside of the object falling range. Alternatively, the vehicle 102 may autonomously move outside of the object falling range.

In some embodiments, when the vehicle 102 is within the object falling range, the server 104 may provide the notification to the device of the driver of the vehicle 102. The driver may drive the vehicle 102 to move outside of the object falling range. Alternatively, the vehicle 102 may autonomously move outside of the object falling range.

Referring back to FIG. 4, in step 408, the controller may operate the feedback loop. In some embodiments, in step 408, the controller may get feedbacks from the driver of the vehicle. In some embodiments, the controller may take a picture of the potentially falling object, the potentially moving object, or both and send the picture to the driver of the vehicle. The driver of the vehicle may determine whether the potentially falling object, the potentially moving object, or both is a threat. The driver may mark the potentially falling object, the potentially moving object, or both as no threat. For example, when the potentially falling object, the potentially moving object, or both is small animal, such as dog, or cat, the controller takes a picture of small animal and send the picture to the driver of vehicle. The driver of vehicle may determine that small animal is not a threat and give the feedback to the controller. When the potentially falling object, the potentially moving object, or both is a garage door, the controller takes a picture of the garage door and send the picture to the driver of vehicle. The driver of vehicle may determine that the garage door is not a threat and give the feedback to the controller. When the potentially falling object, the potentially moving object, or both is a basketball hoop, the controller takes a picture of the basketball hoop and send the picture to the driver of vehicle. The driver of vehicle may determine that the basketball hoop is not a threat and give the feedback to the controller. Based on the feedbacks from the driver of the vehicle, the controller may refine and/or improve the activation step and deactivation step. After the step 408, the controller may activate a fall-on-car prevention function again.

Figure 5:
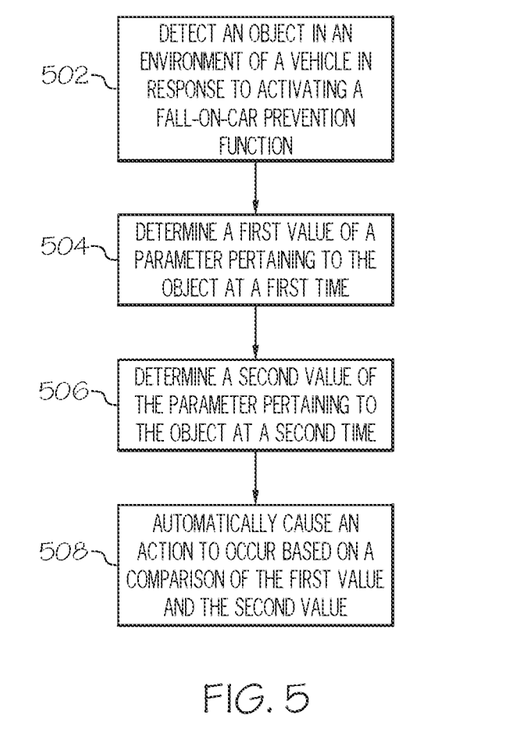
FIG. 5 depicts a flowchart for a method of detecting an object in an environment of a vehicle, according to one or more embodiments shown and described herein.

Referring now to FIG. 5, a flowchart of a method that may be performed by the vehicle, the server, the device, or combinations thereof of FIG. 1 is depicted.

Referring to FIG. 5, in step 502, the controller may detect an object in an environment of the vehicle using one or more sensors. The controller may be included in the vehicle, the server, other vehicle, road side unit, camera, or combinations thereof. For example, the controller of another vehicle or the road side unit detects an object in the environment of the vehicle and informs the detected object to the vehicle. The controller may instruct the one or more sensors to detect the object in an environment of the vehicle. The controller may instruct the sensor to detect the object in an environment of the vehicle in response to an activation of a fall-on-car prevention function. In some embodiments, the fall-on-car prevention function may be automatically activated prior to the vehicle become stationary. For example, referring to FIG. 2, before the vehicle 102 is parked, the controller may observe the surrounding of the vehicle 102, detect nearby object 108 of interest, e.g., a basketball hoop, and activate the fall-on-car prevention function. In some embodiments, the fall-on-car prevention function may be automatically activated after the vehicle becomes stationary. By referring to FIG. 2, after the vehicle 102 is parked, the controller may observe the surrounding of the vehicle 102, detect nearby object 108 of interest, e.g., a basketball hoop, and activate the fall-on-car prevention function. In some embodiments, the fall-on-car prevention function may be periodically activated the fall-on-car prevention function while the vehicle is stationary.

In some embodiments, the fall-on-car prevention function may be activated based on a weather status of the environment of the vehicle. For example, the controller may receive information of a weather status around a location of the vehicle. When the controller receive a bad weather forecast, e.g., windy, snowy, stormy, or etc., the controller may activate the fall-on-car prevention function.

In some embodiments, the fall-on-car prevention function may be activated based on an activation of a button of the vehicle. For example, the driver of the vehicle may activate the button of the vehicle, and then the controller may activate the fall-on-car prevention function.

In embodiments, once the fall-on-car prevention function is activated, the controller of the vehicle may scan the environment of the vehicle and detect an object around the vehicle. The controller may process an image of the object and identify the object. For example, the controller may determine metadata for the object based on the identification of the object, e.g., metadata for a basketball hoop. The metadata may include, but not limited to, metadata for a tree, a pedestrian, a vehicle, bicycle, a drone, an animal, and the like. Once the metadata corresponds to predetermined metadata (e.g., metadata for a tree or a basketball hoop), the controller of the vehicle continuously monitors corresponding object.

Referring back to FIG. 5, in step 504, the controller may determine a first value of a parameter pertaining to the object at a first time with a sensor. By referring to FIG. 2, when the location of the top portion, or key point of the object 108, e.g. the basketball hook up, is moved from the center to left relative to the location where the vehicle 102 is parked, the controller may determine a location of the top portion, or key point of the basketball hoop at time $t_0$, e.g., left from the center, as a first value of a parameter. In some embodiments, the controller may determine the default posture of the basketball hoop in FIG. 2, i.e., the one that is not swinging, as the first value pertaining to the basketball hoop. In some embodiments, the controller may determine the angle between a vertical line and the center axis of the basketball hoop in FIG. 2, as the first value pertaining to the basketball hoop. In this case, the angle between the vertical line and the center axis of the basketball hoop is about 0 degree because the basketball hoop is not swinging.

Referring back to FIG. 5, in step 506, the controller may determine a second value of the parameter pertaining to the object at a second time with the sensor. The controller may determine a second value of the parameter when the vehicle is stationary. By referring to FIG. 2, the controller may determine a location of the top portion, or key point of the basketball hoop at time $t_1$ or $t_2$, as the second value pertaining to the basketball hoop. In some embodiments, the controller may determine the posture of the basketball hoop at time $t_1$ or $t_2$ in FIG. 2, as the second value pertaining to the basketball hoop. In some embodiments, the controller may determine the angle between a vertical line and the center axis of the basketball hoop at time $t_1$ or $t_2$ in FIG. 2, as the second value pertaining to the basketball hoop.

Referring back to FIG. 5, in step 508, the controller may automatically cause an action to occur based on a comparison of the first value of the parameter at the first time and the second value of the parameter at the second time. By referring to FIG. 2, the controller may compare the first value of the parameter and the second value of the parameter. For example, the controller may compare a location of the top portion, or key point of the basketball hoop at time $t_0$ and a location of the top portion, or key point of the basketball hoop at time $t_1$ or $t_2$. In some embodiments, the controller may compare the default posture of the basketball hoop in FIG. 2, i.e., the one that is not swinging, at time $t_0$ and the posture of the basketball hoop at time $t_1$ or $t_2$. In some embodiments, the controller may compare the angle between a vertical line and the center axis of the basketball hoop in FIG. 2 at time $t_0$, about 0 degree, and the angle between a vertical line and the center axis of the basketball hoop at time $t_1$ or $t_2$.

Based on the comparison, the controller may determine whether the object 108 is moving enough such that the object 108 may fall. When the controller determines that the object 108 is moving enough such that the object 108 may fall, the controller may determine whether the vehicle 102 is within the object falling range. The object falling range may be determined based on the distance between the object 108 and the vehicle 102, the size of the object 108, the dimension of the object 108, such as the height of the object 108, the size of the vehicle 102, the dimension of the vehicle 102, or combinations thereof. For example, by referring to FIG. 2, when the relative distance between a location of the top portion, or key point of the basketball hoop at time $t_0$ and a location of the top portion, or key point of the basketball hoop at time $t_1$ or $t_2$ is greater than a threshold distance, the controller may determine that the object 108 is within the object falling range. In some embodiments, when relative angles between a vertical line and the center axis of the basketball hoop at time $t_0$, about 0 degree, and a vertical line and the center axis of the basketball hoop at time $t_1$ or $t_2$ is greater than a threshold angle, the controller may determine that the object 108 is within the object falling range.

When the controller determines that the vehicle is within the object falling range, the controller may instruct the vehicle to move to outside of an object falling range. In some embodiments, when the vehicle is within the object falling range, the server may remotely operate the vehicle to move outside of the object falling range. Alternatively, the vehicle may autonomously move outside of the object falling range.

In some embodiments, when the controller determines that the vehicle is within the object falling range, the controller may provide the notification to the device of the driver. The driver may drive the vehicle to move outside of the object falling range. Alternatively, the vehicle may autonomously move outside of the object falling range. In some embodiments, the driver may remotely connect to the vehicle and remotely move the vehicle to another location through teleoperation.

In some embodiments, the driver of the vehicle or the controller may instruct the sensor to silence future notifications based on the location of the vehicle. The vehicle or the controller may receive the signal from the device of the driver instructing the sensor to silence future notifications. For example, the driver of the vehicle or the controller may instruct the sensor to silence future notifications when there is no object around the vehicle or the object is outside of the object falling range.

In some embodiments, the driver of the vehicle or the controller may instruct the sensor to silence future notifications based on an object classification associated with the object in the environment of the vehicle. The controller may receive a signal from the device of the driver instructing the sensor to silence future notifications. For example, the driver of the vehicle or the controller may instruct the sensor to silence future notifications when the object is small or firmly locked.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system comprising:
a controller programmed to:
instruct a sensor to detect an object in an environment of a vehicle in response to an activation of a fall-on-car prevention function;
determine a first value of a parameter pertaining to the object at a first time with the sensor, the first value corresponding to a first angle between a vertical line and a center axis of the object at the first time at which the object is not swinging;
determine a second value of the parameter pertaining to the object at a second time with the sensor, the second value corresponding to a second angle between the vertical line and the center axis of the object at the second time; and
automatically cause an action to occur based on a comparison of the first value of the parameter at the first time and the second value of the parameter at the second time, wherein the parameter includes a pose of the object.

2. The system of claim 1, wherein the fall-on-car prevention function is automatically activated prior to the vehicle becoming stationary.

3. The system of claim 1, wherein the fall-on-car prevention function is activated based on a weather status of the environment of the vehicle.

4. The system of claim 1, wherein the fall-on-car prevention function is activated in response to an activation of a button of the vehicle.

5. The system of claim 1, wherein the controller is further programmed to periodically activate the fall-on-car prevention function while the vehicle is stationary.

6. The system of claim 1, wherein the action provides a notification to a device of a driver for the vehicle indicative of the object falling based on the comparison of the first value of the parameter at the first time and the second value of the parameter at the second time.

7. The system of claim 6, wherein the controller is further programmed to receive a signal from the device of the driver instructing the sensor to silence future notifications based on a location of the vehicle.

8. The system of claim 6, wherein the controller is further programmed to receive a signal from the device of the driver instructing the sensor to silence future notifications based on an object classification associated with the object in the environment of the vehicle.

9. The system of claim 1, wherein the action provides a notification to a server communicatively coupled to the vehicle, the notification indicative of the comparison of the first value of the parameter at the first time and the second value of the parameter at the second time.

10. The system of claim 1, wherein the action comprises operating the vehicle outside of an object falling range, the object falling range being determined based on a size of the object, a dimension of the object, a size of the vehicle, a dimension of the vehicle, or combinations thereof.

11. The system of claim 1, wherein the controller is further programmed to:
determine an object falling range based on a size of the object, a dimension of the object, a size of the vehicle, a dimension of the vehicle, or combinations thereof;
determine whether the vehicle is within the object falling range; and
transmit a notification to a device of a driver in response to determining that the vehicle is within the object falling range.

12. A method of detecting an object in an environment of a vehicle, comprising:
detecting an object in an environment of a vehicle in response to an activation of a fall-on-car prevention function;
determining a first value of a parameter pertaining to the object at a first time with a sensor, the first value corresponding to a first angle between a vertical line and a center axis of the object at the first time at which the object is not swinging;
determining a second value of the parameter pertaining to the object at a second time with the sensor, the second value corresponding to a second angle between the vertical line and the center axis of the object at the second time; and
automatically causing an action to occur based on a comparison of the first value of the parameter at the first time and the second value of the parameter at the second time, wherein the parameter includes a pose of the object.

13. The method of claim 12, wherein the fall-on-car prevention function is automatically activated prior to the vehicle becoming stationary.

14. The method of claim 12, wherein the fall-on-car prevention function is activated based on a weather status of the environment of the vehicle.

15. The method of claim 12, wherein the fall-on-car prevention function is activated in response to an activation of a button of the vehicle.

16. The method of claim 12, further comprising periodically activating the fall-on-car prevention function while the vehicle is stationary.

17. The method of claim 12, wherein the action provides a notification to a device of a driver indicative of the object falling based on the comparison of the first value of the parameter at the first time and the second value of the parameter at the second time.

18. The method of claim 17, further comprising receiving a signal from the device of the driver instructing the sensor to silence future notifications based on a location of the vehicle.

19. The method of claim 17, further comprising receiving a signal from the device of the driver instructing the sensor to silence future notifications based on an object classification associated with the object in the environment of the vehicle.

* * * * *